United States Patent [19]
Seid et al.

[11] Patent Number: 5,593,220
[45] Date of Patent: Jan. 14, 1997

[54] CANTILEVERED LATCH MECHANISM FOR AN ENCLOSURE

[75] Inventors: Calvin Q. Seid, Palo Alto; David H. Titzler, Newbury Park, both of Calif.

[73] Assignee: Apple Computer, Inc., Cupertino, Calif.

[21] Appl. No.: 432,917

[22] Filed: May 1, 1995

[51] Int. Cl.$^6$ .................................................. A47B 47/00
[52] U.S. Cl. .................................. 312/265.6; 312/293.3; 312/223.2; 403/326; 361/724; 292/DIG. 38
[58] Field of Search .............................. 312/265.6, 293.3, 312/223.2, 222, 263, 257.1, 111; 403/321, 322, 326, 329; 361/683, 724; 174/66, 67; 292/19, 80, 91, DIG. 38

[56] References Cited

U.S. PATENT DOCUMENTS

| | | | |
|---|---|---|---|
| 4,500,746 | 2/1985 | Meehan | 174/66 X |
| 4,717,216 | 1/1988 | Hornak | 361/724 X |
| 5,199,776 | 4/1993 | Lin | 312/293.3 |
| 5,397,176 | 3/1995 | Allen et al. | 312/265.6 X |
| 5,423,605 | 6/1995 | Liu | 312/265.6 |
| 5,458,511 | 10/1995 | Sasai et al. | 403/326 X |
| 5,491,611 | 2/1996 | Stewart et al. | 312/223.2 |

*Primary Examiner*—Peter M. Cuomo
*Assistant Examiner*—James O. Hansen
*Attorney, Agent, or Firm*—Burns, Doane, Swecker & Mathis, L.L.P.

[57] ABSTRACT

An enclosure for a personal computer having a latch and release mechanism having at least two parallel cantilevered arms that allow the mechanism to have both strength for holding the enclosure to the personal computer and restrained flexibility that causes the distal end of the latch and release mechanism to travel translationally for releasing the enclosure.

15 Claims, 8 Drawing Sheets

CANTILEVERED LATCH MECHANISM FOR AN ENCLOSURE

BACKGROUND OF THE INVENTION

1. Field of the Invention

The present invention is directed to an enclosure having a front release system, especially useful as an enclosure for an electronic appliance and more particularly to a novel and improved type of releasable latch.

2. Prior Art

The enclosure for many electronic appliances in the market today typically is a metal or plastic cover held on by screws or bolts that attach the enclosure to a metal back wall of the electronic appliance. This is true in particular for personal computers. In some limited models, the enclosure is a plastic cover held to the metal back wall of the personal computer by plastic latches. Some latches are designed for release without tools. In any event, the latch & release mechanisms are located at the back of the personal computer. This location makes configuring, servicing, up-grading, and manufacturing of the personal computer more time consuming and difficult. Often times, releasing the mechanism is a blind procedure because either the personal computer is too heavy to turn around or it is located such that it is inconvenient or impossible to turn around.

It would be desirable to provide a personal computer that is more efficiently configurable, manufacturable, up-gradeable and serviceable by technicians, original equipment manufacturers, or the end-user.

SUMMARY OF THE INVENTION

The present invention accomplishes the desires noted above and overcomes short comings of the prior art devices. To accomplish these purposes there is provided a latch and release mechanism comprised of parallel cantilevered elements that allow the mechanism to have both strength for holding the enclosure to the personal computer and flexibility for releasing the enclosure.

In one aspect of the invention there is provided an apparatus comprising a chassis, a removable enclosure extending around said chassis, and at least one manually actuable latch attached to one of said chassis and enclosure and releasably connectable to the other of said chassis and enclosure, said at least one latch comprising a fixed end fixed to said one of said chassis and enclosure, a movable end opposite said fixed end and releasably connectable to said other of said chassis and enclosure, and at least two flexible cantilevered arms interconnecting said fixed end and said movable end for constraining said movable end to move translationally in an imaginary plane passing through said fixed and movable ends and said cantilevered arms.

DESCRIPTION OF THE PREFERRED EMBODIMENTS

Figure 1A:
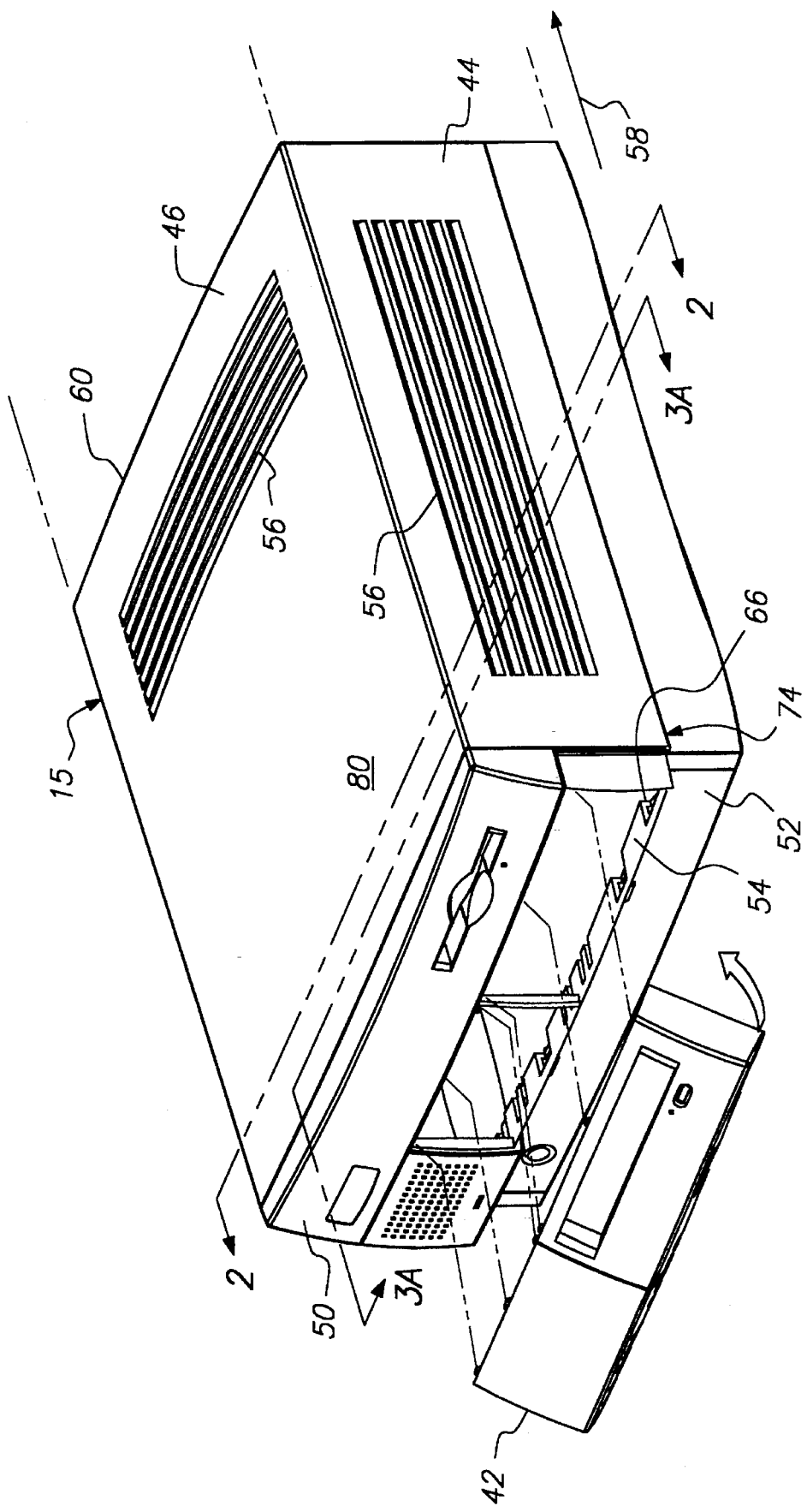
FIGS. 1A and 1B are an exploded isometric view of a personal computer and an enclosure in accordance with one embodiment of the present invention.
Figure 1B:
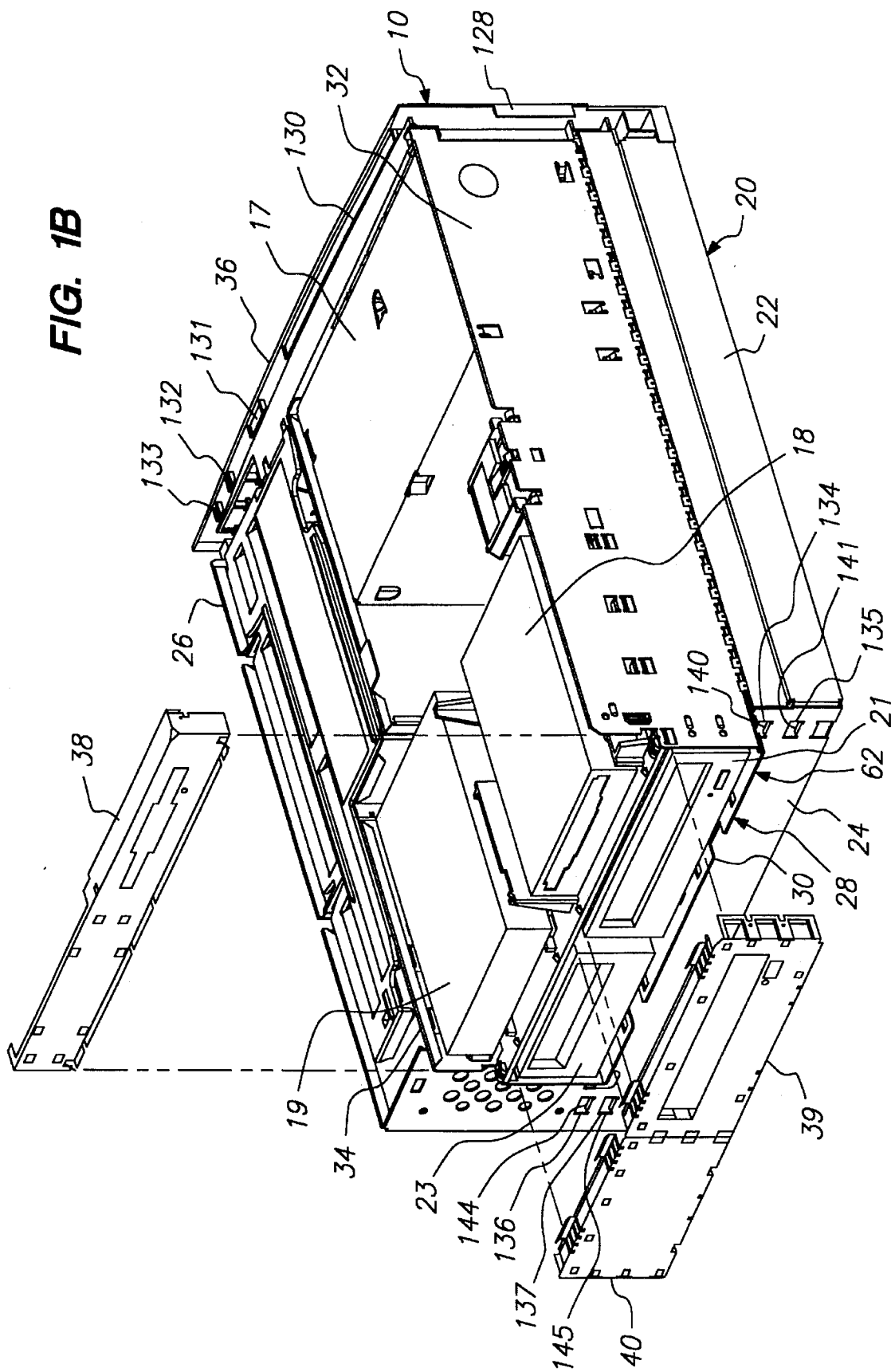

With continued reference to the drawing, FIGS. 1A and 1B are a personal computer 10 with enclosure 15. Personal computer 10 has several pieces of electronic equipment 17, 18, 19, 21 and 23 assembled into a chassis or base 20. Although the present invention is disclosed in connection with a personal computer, the present invention is also applicable to other electronic appliances such as televisions, radios, modems, CD-ROM drives, printers, external disk drives, etc. In accordance with one embodiment of the present invention, chassis 20 is comprised of a lower right side wall 22, front wall 24, and left side wall 26 (FIG. 1B). In the embodiment shown in FIG. 1B, an upper chassis 28 is supported by lower right side wall 22, a lower portion of front wall 24 and supports (not shown) under bottom wall 30 of upper chassis 28. Upper chassis 28 is comprised of bottom wall 30, upper right side wall 32, and upper left side wall 34. Upper chassis 28 is hinged along upper right side wall 32 to lower side wall 22 so that the upper chassis can be rotated out of the way for gaining access to electronic components located below the upper chassis. As one of ordinary skill in the art will appreciate, the upper chassis and lower chassis can have many configurations including only being one chassis in which the upper right side wall and lower right side wall are continuous, instead of being hinged.

In the embodiment shown in FIG. 1B, chassis 20 is enclosed in the rear by rear wall 36. Faceplates 38, 39, and 40 are added to shield the electronic equipment 18, 19, 21 and 23 located at the front of computer 10. Faceplates 38, 39, and 40, chassis 20, upper chassis 28, and rear wall 36 are typically metallic so that they prevent or minimize electromagnetic radiation from exiting the computer. Additionally or alternatively, plastic faceplates with walls lined with metallic shields can be used to provide electromagnetic radiation protection.

Enclosure 15 can be assembled to chassis 20 usually after the electronic equipment, faceplates and all other components are assembled in the computer. Enclosure 15 can have an optional removable face covering 42 that allows access to faceplates 39,40 and electronic equipment 21,23. In one embodiment, enclosure 15 is comprised of right side wall 44, top wall 46, left side wall 48 (FIG. 2), upper front wall 50 and lower front wall 52. Rear wall 36 and chassis 20 complete the enclosure of the personal computer. Preferably, right side wall 44, top wall 46, left side wall 48, upper front wall 50 and lower front wall 52 are lined on their inner surfaces 45, 47, 49, 51 and 53 (FIGS. 2, 3A and 3B), respectively, with metallic shields (not shown) to prevent or reduce electromagnetic radiation emitted from the computer. Vents can be provided to allow heat to escape from the enclosure. For example, right side wall 44, top wall 46, and left side wall 48 (not shown in FIG. 1A) can be provided with vents 56.

Upper front wall 50 is offset horizontally from lower front wall 52. A horizontal overhang 54 extends between upper front wall 50 and lower front wall 52. When enclosure 15 is assembled over chassis 20 (as will be described in detail below), extended portion 62 of upper chassis 28 extends over inner surface 64 of overhang 54. Portions of overhang 54 and lower front wall 52 are cut-away resulting in openings 66 and 68.

Figure 2:
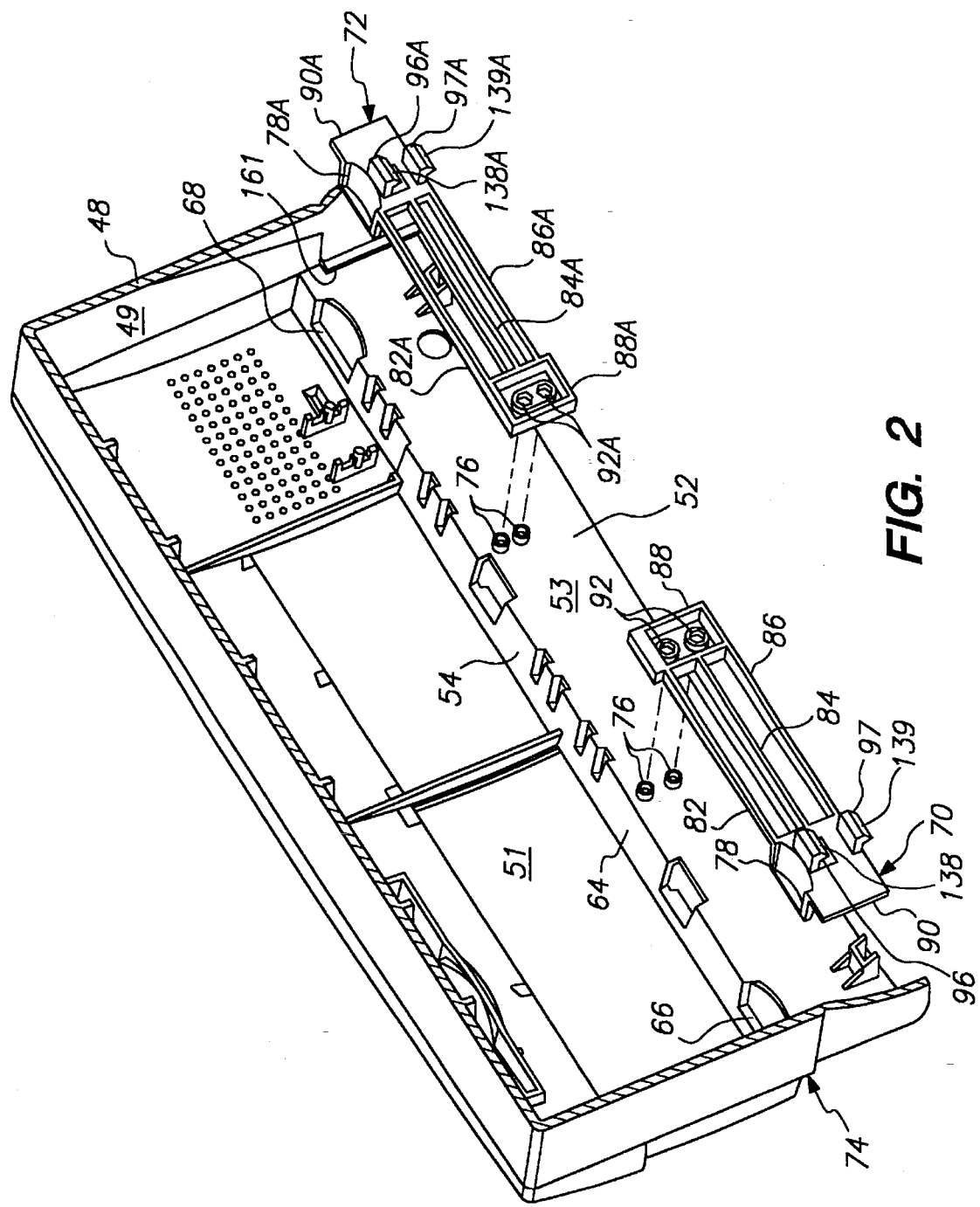
FIG. 2 is a rear exploded isometric view taken along line 2—2 in FIG. 1.
Figure 3A:
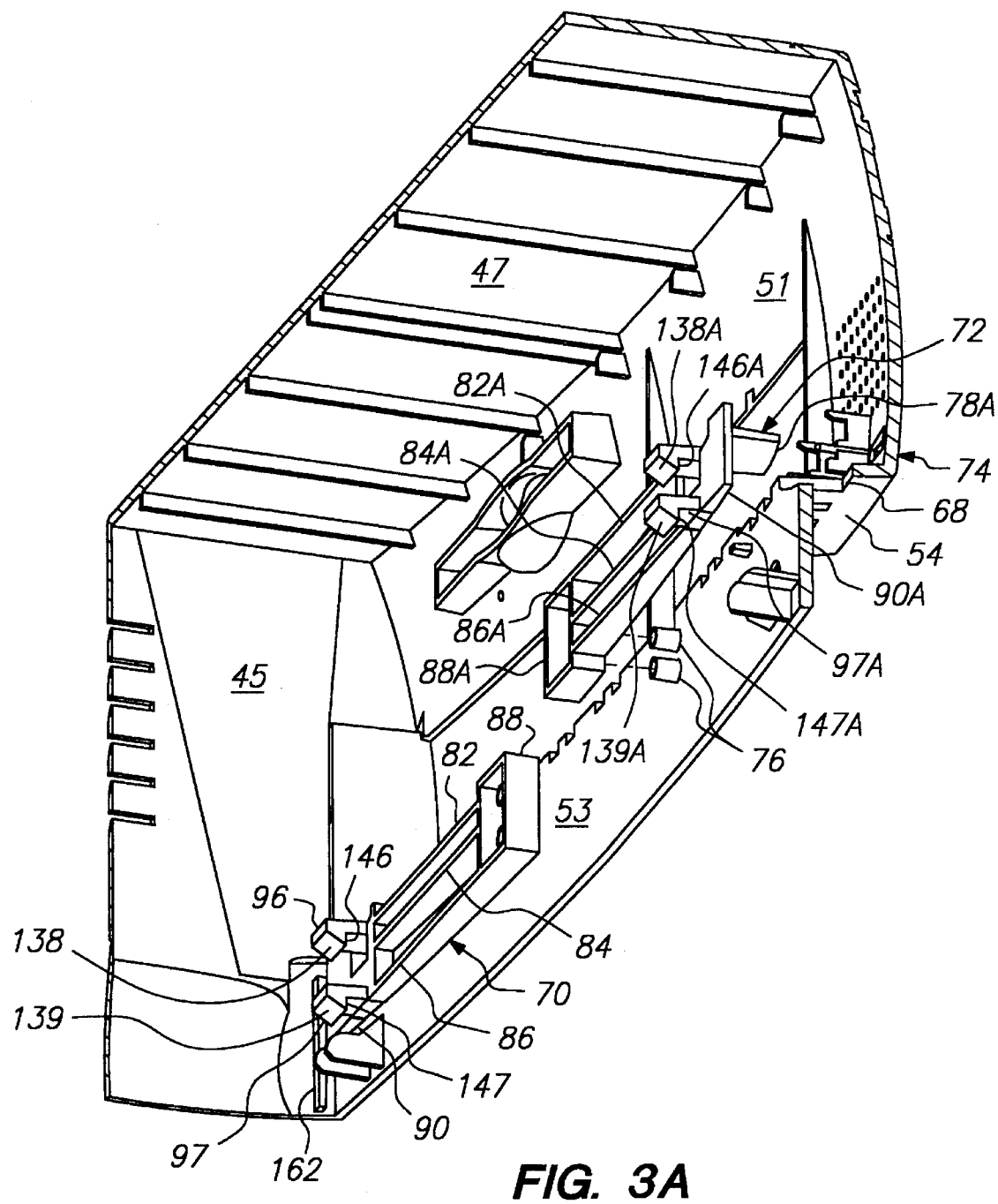
FIG. 3A is a rear partially exploded isometric view taken along line 3A—3A in FIG. 1.
Figure 3B:
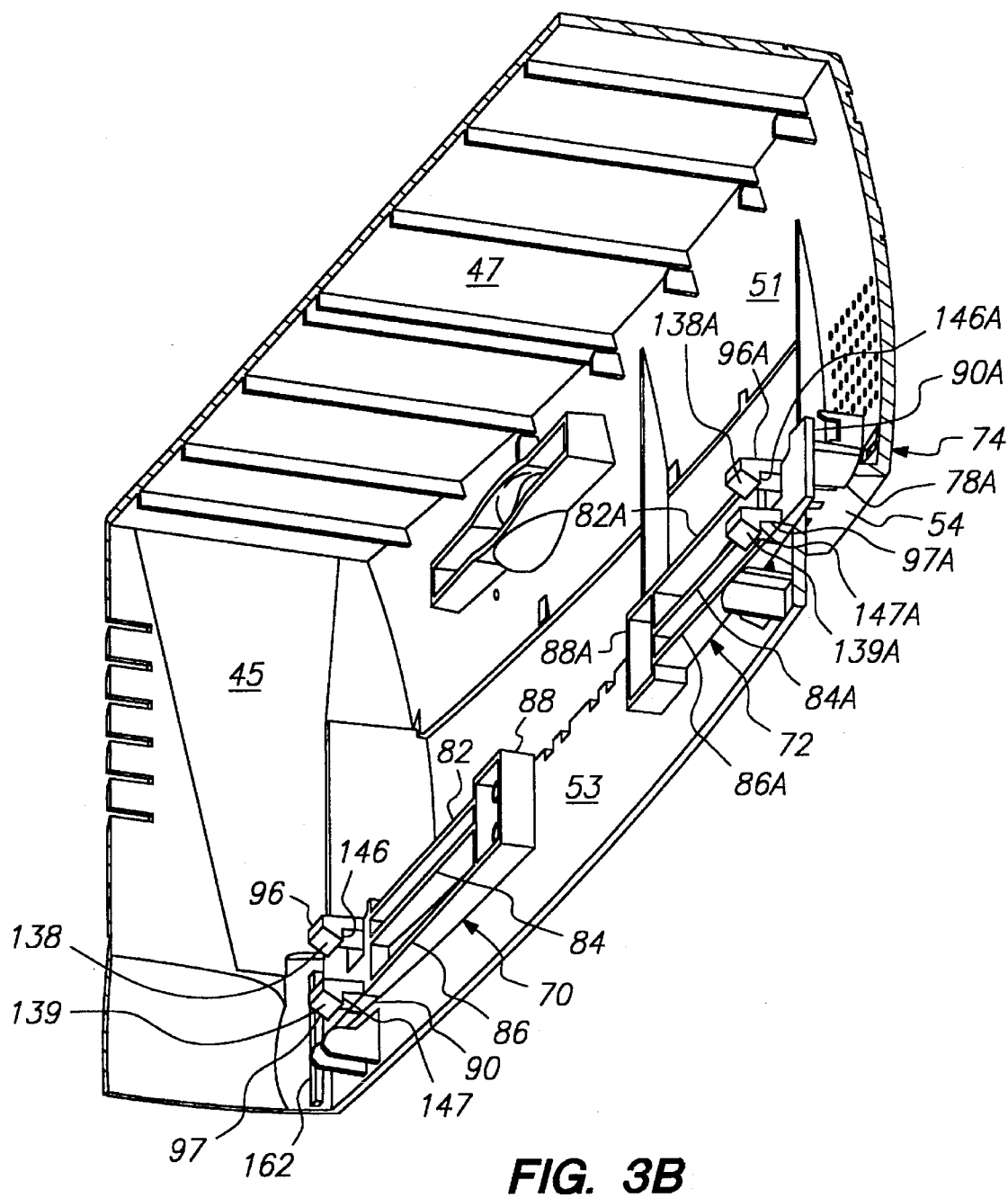
FIG. 3B is a rear assembled isometric view of FIG. 3A.
Figure 4:
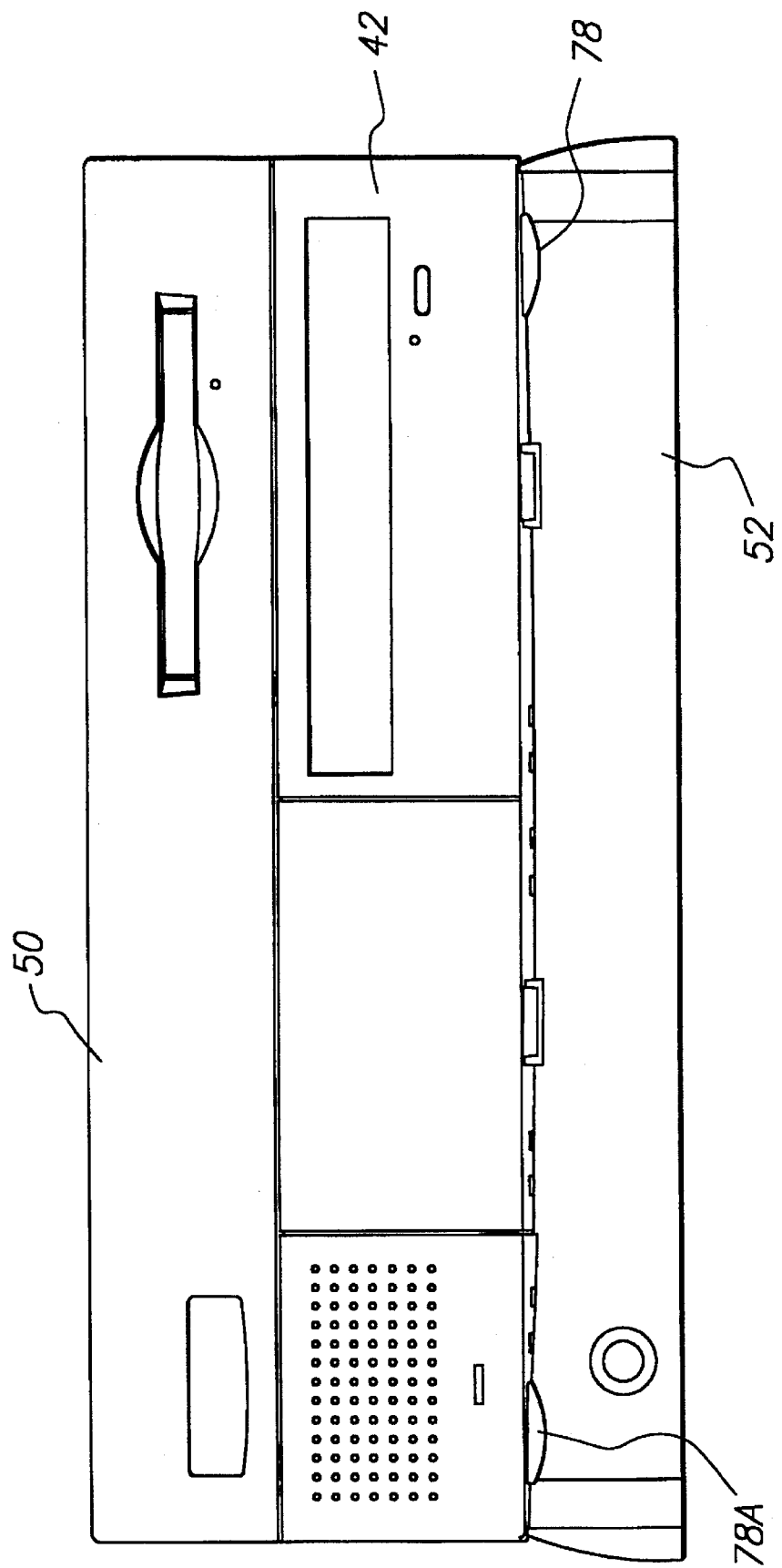
FIG. 4 is a front elevational view of the assembled personal computer of FIGS. 1A and 1B.
Figure 5:
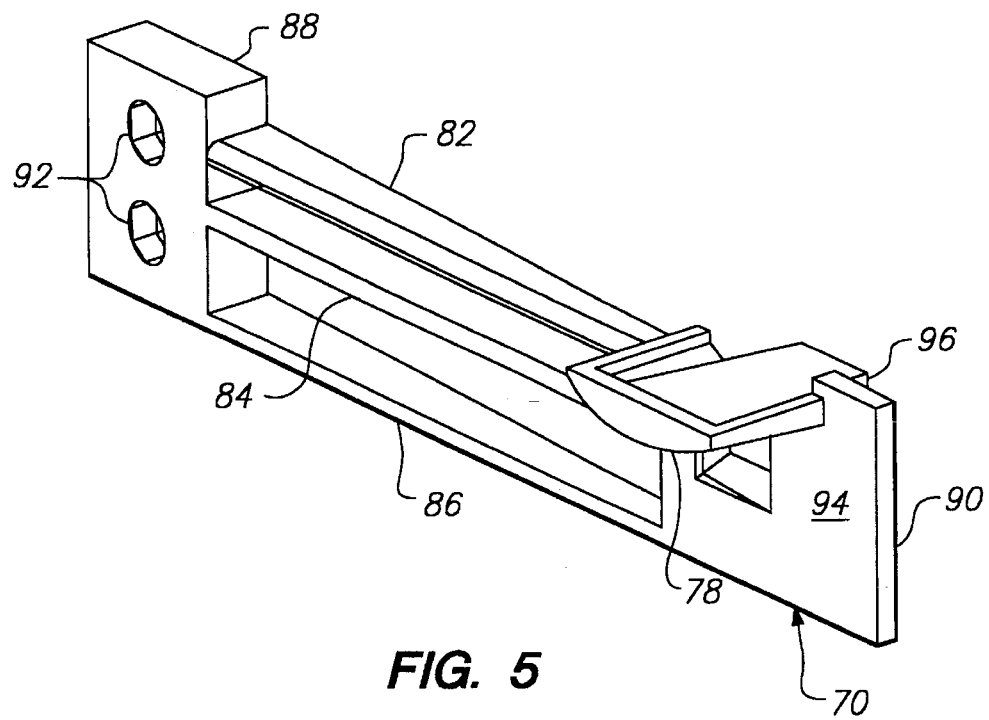
FIG. 5 is a front isometric view of a right-side latch in accordance with one embodiment of the present invention.
Figure 6:
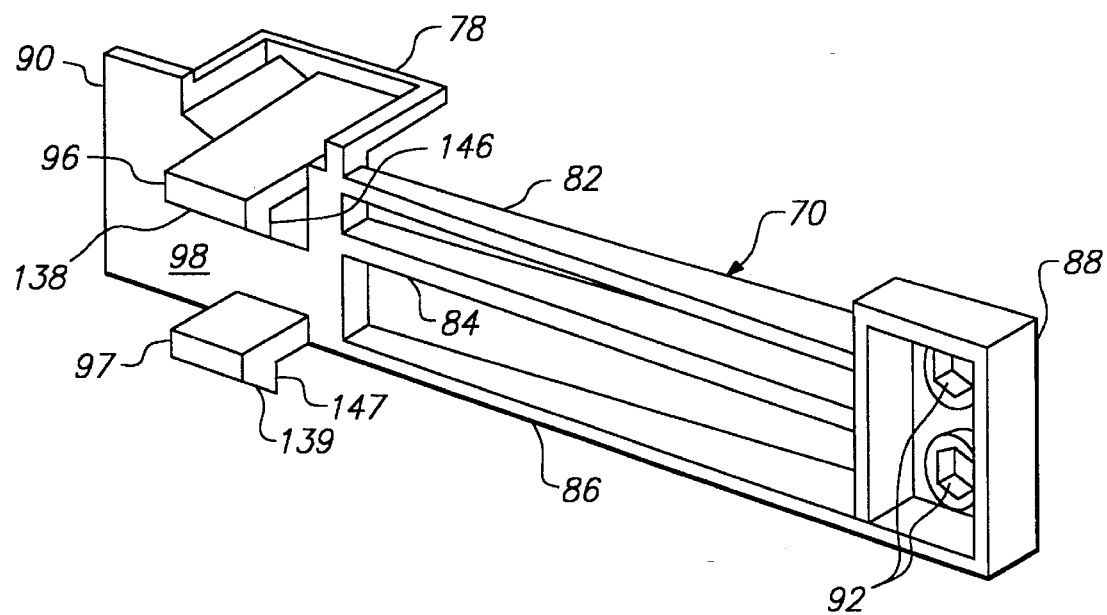
FIG. 6 is a rear isometric view of the latch shown in FIG. 5.
Figure 7:
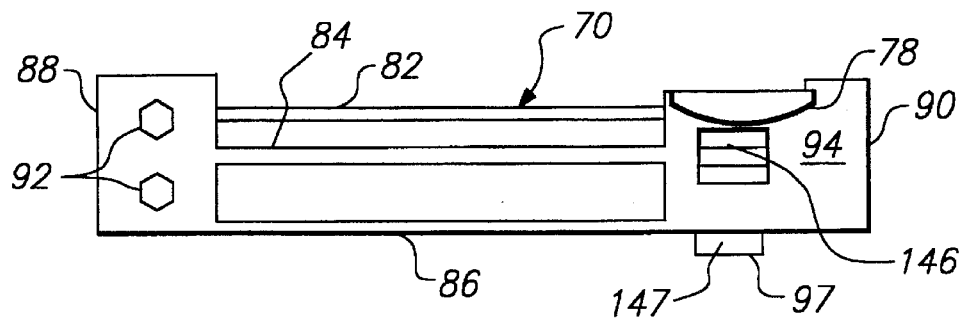
FIG. 7 is a front elevational view of the latch shown in FIG. 5.

Openings 66 and 68 allow access to a latch means comprising right latch 70 and left latch 72 at forward end 74 of enclosure 15. The latch means may not be visible from the top of the enclosure and only minimally visible from the front of the enclosure. Right latch 70 and left latch 72 are attached to studs 76 which project from an inner face 53 of the lower front wall 52. That connection can be by friction press fit, heat staking, adhesive bonding, etc. (FIGS. 2, 3A and 3B). When right latch 70 and left latch 72 are attached to the studs 76, release levers 78 and 78A of the latches extend through respective openings 66 and 68 such that the release levers are accessible from the front of the enclosure (FIG. 4).

Alternatively, the release levers could extend through openings (not shown) formed in right side wall 44 and left side wall 48 near forward end 74 of enclosure 15. Likewise, the levers could be released by pressing in, pushing down or pulling out on the tabs instead of lifting up on them.

Figure 8:
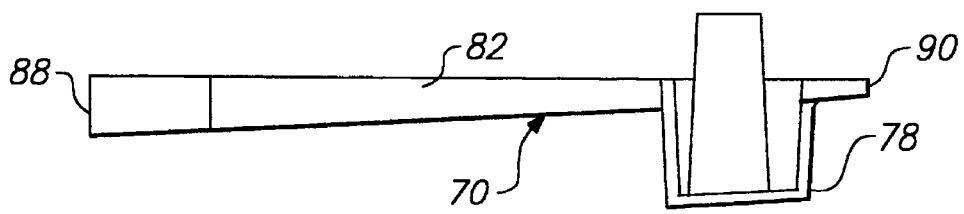
FIG. 8 is a top plan view of the latch shown in FIG. 7.

Right latch 70 (FIGS. 6–9) comprises cantilevered beams or arms 82,84,86 extending from first end 88 to second or distal end 90. First end 88 has openings 92 for mounting on studs 76. Openings 92 can be many shapes but are shown as hexagonal. The hexagonal shape provides for increased friction by making the distance between faces in the hexagon smaller that the diameter of the stud. In addition, the hexagonal shape provides the ability to use fasteners with hexagonal shaped heads if desired. As can best be seen in FIG. 8, right latch 70 (thus beams 82, 84, 86) taper down from first end 88 to distal end 90 which results in greater flexibility of the latch at its distal end 90. Release lever 78 is disposed at the distal end 90 and extends outward from a front surface 94 thereof. Catches or hooks 96, 97 extend from rear surface 98 of distal end 90. The purpose of hooks 96,97 will be described in more detail below.

Left latch 72 is essentially a mirror image of right latch 70. The elements of left latch 72 have an A attached to their reference number in the figures.

Figure 9:
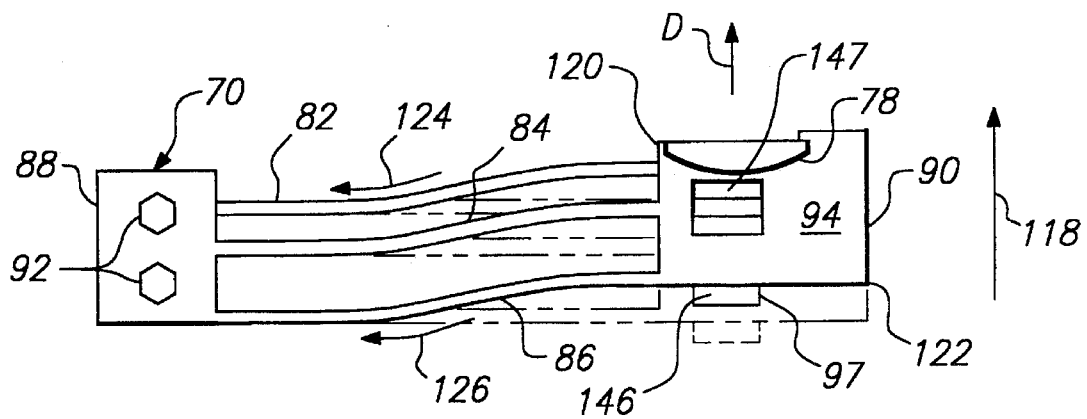
FIG. 9 is a front elevational view showing the movement of the latch shown in FIG. 5.

Having two or more cantilevered beams spaced from each other on right latch 70 and left latch 72 causes the distal end (thus the hooks) to travel in a longitudinal direction instead of in an arched path when the distal end is pushed up and the first end is secured. FIG. 9 illustrates the operation of right latch 70. For simplicity, only the movement of latch 70 will be described as left latch 72 operates in the same manner. As force is exerted on release lever 78 in the direction of arrow 118, distal end 90 is displaced longitudinally or translationally in direction D (FIG. 9). The movement is not strictly vertical as there is a small lateral displacement because the beams are a fixed length. This displacement is, however, minimal and the overall motion can be considered to be essentially vertical. As distal end 90 travels translationally, beams 82,84,86 distort from their resting position (shown in phantom) to take on a flat S shape. The beams of each latch are made of elastic or resilient material, such as plastics, woods, alloys, etc. or combinations thereof well known to one skilled in the art that can be repeatedly flexed and still return to their original shape. Examples of plastics include, but are not limited to, polypropylene and nylon.

Distal end 90 and hooks 96,97 travel in essentially a straight line (i.e., distal end 90 remains parallel to first end 88) as long as there are at least two beams in the latch. If there were only one beam, for example beam 82, then as lever 78 was lifted, beam 82 would take on a simple arc or banana shape and as a result upper corner 120 would be pulled toward first end 88 by the lateral resistance created by beam 82 (shown by arrow 124) and lower corner 122 would have no lateral resistance and thus swing out and up such that distal end 90 would travel in an arched path. By adding a second beam 84 or 86, spaced from beam 82, distal end 90 is confined to travel in a straight line. That is, when lever 78 is lifted, beam 82 would want to take on a banana-shape and lower corner 122 would want to swing out, but due to the presence of the second beam 86, the lower corner 122 is confined by the lateral resistance created by beam 86 (shown by arrow 126) that acts to pull lower corner 122 back toward first end 88. As a result, distal end 90 travels upward in a straight line. The distal end is constrained to move translationally in an imaginary plane passing through the first and distal end of the cantilevered arms.

Another constraint can be added to the movement of distal ends 90, 90A in the form of fib 161 (FIG. 2) and rib 162 (FIGS. 3A and 3B) projecting from the inner surfaces of the left side wall and right side wall, respectively, of enclosure 15. When latch 70 and 72 are installed on studs 76, a portion of distal ends 90 and 90A is captured between inner surface 53 and ribs 162, 161, respectively. Ribs 162, 161 act as a guide to help restrain the distal ends of each latch to the translational movement previously described. In addition, ribs 162, 161 prevent the enclosure from becoming disconnected from the chassis when the assembled structure is lifted by the front of the enclosure. Specifically, when the assembled structure is lifted by the front of the enclosure, hooks 96, 96A, 97, 97A are retained in openings 134, 135, 136, 137, respectively, (as will be described in more detail below) thus causing distal ends 90, 90A to be pulled away from inner surface 53 of the enclosure. However, fibs 162, 161 prevent the distal ends from being pulled away from the inner surface.

As will be discussed below, the approximately straight vertical travel of hooks 96,97 is an advantage in releasing enclosure 15 from chassis 20. However, it should be appreciated that this is only one embodiment for a latch mechanism, and that any of a number of latch mechanisms, including but not limited to single beam latches, latches that travel horizontally instead of vertically, release mechanisms on the side of the enclosure, can be used to provide an enclosure that has a latch and release mechanism at the front of the enclosure in accordance with the present invention.

Enclosure 15 can be slid over chassis 20 in the direction of arrow 58 so that rear edge 60 gets closer to the top of chassis 20. Alternatively, the enclosure 15 can be slid down over chassis 20 with some gap between rearward end 60 and rear wall 36 of chassis 20. In either event, the enclosure is releasably attached to the chassis by sliding enclosure 15 toward rear wall 36 to close the gap between them. As rearward end 60 comes into contact with rear wall 36, tabs (not shown) attached to inner surface 45 of right side wall 44 slide behind tab 128 extending from the right vertical edge of rear wall 36 (FIG. 1B). Tab 128 rests between inner surface 45 and the tab extending from inner surface 45 to prevent right side wall 44 from moving in or out with respect to the chassis. Similarly, tabs (not shown) attached to inner surface 49 of left side wall 48 slide behind a tab (not shown)

extending from the left vertical edge of rear wall 36 to prevent left side wall 48 from moving in or out with respect to the chassis. Top wall 46 is held down by tabs (not shown) attached to inner surface 47 which slide underneath tabs 130,131,132,133 extending from rear wall 36 along its top edge. Tabs 130,131,132,133 rest between inner surface 47 and the tabs extending from inner surface 147 to prevent top wall 46 from moving up and down with respect to the chassis.

In FIG. 1A, right latch 70 and left latch 72 are not shown installed on the inner surface of lower front wall 52. However, it should be understood that right latch 70 and left latch 72 are installed on the inner surface of the enclosure (as shown in FIG. 3B) before the enclosure is attached to the chassis. As the tabs on the rear of enclosure 15 engage the tabs on the rear wall, hooks 96,97 of right latch 70 enter openings 134,135, respectively, in front wall 24 of chassis 20, and hooks 96A, 97A of left latch 72 enter openings 136,137 (FIG. 1B). Hooks 96,97 have camming surfaces 138,139 that displace distal end 90 vertically as the camming surfaces contact and are forced over lower edges 140,141 of openings 134,135. Likewise, hooks 96A, 97A have camming surfaces 138A, 139A that displace distal end 90A vertically as the camming surfaces contact and are forced over lower edges 144,145 of openings 136,137.

After the hooks of each latch pass completely through their respective openings, the resilient nature of the beams of the latch displaces the distal end of each latch downward. As a result, latching surfaces 146,147 of right latch 70 releasably lock enclosure 15 to chassis 20 by extending behind a portion of front wall 24 below openings 134,135. Likewise, latching surfaces 146A, 147A of left latch 72 releasably lock enclosure 15 to chassis 20 by extending behind a portion of front wall 24 below openings 136,137. The multiple latching surfaces of the present embodiment provide sufficient strength for the assembled enclosure to be lifted by the front of the enclosure without the enclosure becoming disconnected from the chassis.

Before now, latching mechanisms that have been used to hold an enclosure on a device chassis have been near the rear of the enclosure resulting in great difficulty for removing the enclosure. With the latch mechanism of the present invention at the forward end of the enclosure, access can be gained to the inside of the device quickly and easily by simply: placing the first finger or the middle finger of each hand on release levers 78,78A; grasping enclosure 15 by placing each thumb on top surface 80 just above upper front wall 50; pressing up on each lever 78,78A; sliding and then lifting the enclosure off chassis 20.

The translational movement, as described above, of the distal ends of each of the latches is advantageous in releasing and removing the enclosure from the chassis. Because the latching surfaces travel vertically along a straight line, levers 78,78A only have to be raised an amount equal to the height of the latching surfaces in order for the latching surfaces to clear the lower edges of each opening. If the latching surfaces moved in an arched path, the distal most ends of each latching surface would have to be raised higher in order for the more proximal end of the latching surface to clear the lower edges of the openings (or the relative size and shape of the openings and latching surface would have to be adapted to the geometry of the latch action).

Modifications and variations of the present invention will be apparent to those having ordinary skill in the art having read the above teachings, and the present invention is thus limited only by the spirit and scope of the following claims.

The invention claimed is:

1. An apparatus comprising:

a chassis;

a removable enclosure extending around said chassis; and at least one manually actuable latch attached to one of said chassis and enclosure and releasably connectable to the other of said chassis and enclosure, said at least one manually actuable latch comprising:
   a fixed end fixed to said one of said chassis and enclosure,
   a movable end opposite said fixed end and releasably connectable to said other of said chassis and enclosure, and
   at least two flexible cantilevered arms connected together at said movable end and interconnecting said fixed end and said movable end for constraining said movable end to move translationally in an imaginary plane passing through said fixed and movable ends and said cantilevered arms.

2. The apparatus of claim 1 wherein said at least one manually actuable latch further includes a third flexible cantilevered arm interconnecting said fixed end and said movable end for constraining said movable end to move translationally in an imaginary plane passing through said fixed and movable ends and said cantilevered arms.

3. The apparatus of claim 1 wherein said movable end includes a locking tab for releasably engaging said chassis, and a manually actuable release lever.

4. The apparatus of claim 3 wherein said fixed end is fixed to an inner surface of said enclosure, and said manually actuable release lever projects through an opening formed in said enclosure.

5. The apparatus of claim 4 wherein said enclosure includes a front wall, said fixed end being attached to said front wall, said movable end being movable substantially vertically.

6. The apparatus of claim 5 wherein there are two said latches disposed adjacent respective ends of said front wall.

7. The apparatus of claim 6 wherein each of said cantilevered arms taper-down in a dimension perpendicular to the imaginary plane toward said movable end.

8. The apparatus of claim 1 further including:

a guide attached to said removable enclosure; and wherein said movable end of said at least one manually actuable latch is slidably retained by said guide such that said movable end is constrained to move translationally in the imaginary plane passing through said fixed and movable ends and said cantilevered arms.

9. An apparatus comprising:

a chassis;

a removable enclosure extending around said chassis; and at least one manually actuable latch attached to one of said chassis and enclosure and releasably connectable to the other of said chassis and enclosure, said at least one manually actuable latch comprising:
   a fixed end fixed to said one of said chassis and enclosure,
   a movable end opposite said fixed end and releasably connectable to said other of said chassis and enclosure, and
   at least three flexible cantilevered arms interconnecting said fixed end and said movable end for constraining said movable end to move translationally in an imaginary plane passing through said fixed and movable ends and said cantilevered arms.

10. An apparatus comprising:

a chassis;

a removable enclosure extending around said chassis; and at least one manually actuable latch attached to the enclosure and releasably connectable to the chassis, said at least one manually actuable latch comprising:
- a fixed end fixed to the enclosure,
- a movable end opposite said fixed end and releasably connectable to the chassis, said movable end having a locking tab for releasably engaging said chassis and a manually actuable release lever, and
- at least two flexible cantilevered arms interconnecting said fixed end and said movable end for constraining said movable end to move translationally in an imaginary plane passing through said fixed and movable ends and said cantilevered arms.

11. The apparatus of claim 10 wherein said fixed end is fixed to an inner surface of said enclosure, and said manually actuable release lever projects through an opening formed in said enclosure.

12. The apparatus of claim 11 wherein said enclosure includes a from wall, said fixed end being attached to said front wall, said movable end being movable substantially vertically.

13. The apparatus of claim 12 wherein there are two said latches disposed adjacent respective ends of said front wall.

14. The apparatus of claim 13 wherein each of said cantilevered arms taper-down in a dimension perpendicular to the imaginary plane toward said movable end.

15. An apparatus comprising:

a chassis;

a removable enclosure extending around said chassis, said removable enclosure having a guide attached thereto; and at least one manually actuable latch attached to one of said chassis and enclosure and releasably connectable to the other of said chassis and enclosure, said at least one manually actuable latch comprising:
- a fixed end fixed to said one of said chassis and enclosure,
- a movable end opposite said fixed end and releasably connectable to said other of said chassis and enclosure, and
- at least two flexible cantilevered arms interconnecting said fixed end and said movable end, said movable end is slidably retained by said guide such that said movable end is constrained to move translationally in an imaginary plane passing through said fixed and movable ends and said cantilevered arms.

* * * * *